United States Patent [19]

Copeland

[11] Patent Number: 4,763,416
[45] Date of Patent: Aug. 16, 1988

[54] FIELD DRESSING ATTACHMENT FOR HUNTING KNIFE

[76] Inventor: W. Duane Copeland, Rte. 8, Goodwin Rd., Durham, N.C. 27712

[21] Appl. No.: 54,834

[22] Filed: May 26, 1987

[51] Int. Cl.$^4$ .............................................. A22B 5/16
[52] U.S. Cl. ..................................... 30/294; 30/123.5; 17/21
[58] Field of Search ...................... 30/123.5, 286, 294, 30/151; 17/1 R, 21

[56] References Cited

U.S. PATENT DOCUMENTS

| D. 275,360 | 9/1984 | Child | D7/151 |
|---|---|---|---|
| 933,626 | 9/1909 | Coomber | 30/286 |
| 2,040,719 | 5/1936 | Walch | 30/286 X |
| 2,255,930 | 9/1941 | Jepson | 30/320 |
| 2,466,898 | 4/1949 | Johnson | 30/286 |
| 3,241,236 | 3/1966 | Capps | 30/287 |
| 4,290,201 | 9/1981 | Goodwin | 30/294 |
| 4,707,920 | 11/1987 | Montgomery | 17/21 X |

Primary Examiner—Frank T. Yost
Assistant Examiner—Michael D. Folkerts
Attorney, Agent, or Firm—Steven J. Hultquist

[57] ABSTRACT

A device attachable to a hunting knife, to adapt same for skinning and field dressing operation. The device comprises a guard member adapted to fit over only a tip portion of the knife blade, with a passage in the guard member receiving the tip portion of the blade, so that the guard member when attached leaves exposed a major portion of the blade cutting surface of the knife, while occluding the tip portion of the blade from cutting exposure. The attachment also features means for removably retaining the guard member in position at the tip portion of the knife blade, such as a leather thong extending through a hole in the proximal part of the guard member, whose end portions may be grasped to retain the guard member in position. The skinning and field dressing attachment device of the invention is readily detachably secured to the knife blade tip portion, to accommodate a quick and simple conversion of the hunting knife to skinning and/or field dressing operation.

7 Claims, 1 Drawing Sheet

FIELD DRESSING ATTACHMENT FOR HUNTING KNIFE

BACKGROUND OF THE INVENTION

1. Field of the Invention

This invention relates generally to hunting knives, and specifically to an attachable device for adapting a hunting knife for skinning and field dressing operation.

2. Description of the Related Art

In the hunting of game animals such as deer, elk, and antelope, the field dressing and skinning of animals is generally carried out with specialized knives, such as so-called gutting knives. These knives feature rounded ends to avoid perforation of stomach, intestines, and other internal organs during the field dressing/skinning operations. Such perforation is undesirable because it imparts an unappealing taste to the meat of the game animal, and accelerates the spoiling of such meat. For similar reasons, it is desired in the field dressing/skinning operation to avoid unnecessary or excessive cutting penetration of the meat itself.

Although game hunters frequently carry conventional type single-bladed or double-bladed hunting knives, such hunting knives are not suitable for such skinning and field dressing operations due to the fact that the tip portion of the hunting knife blade is typically pointed in character. With such pointed-end blade configuration, the occurrence of undesirable cutting and/or perforation of the game meat and internal organs, with the attendant consequences above described, is highly probable, since it is difficult to rigorously control the depth of penetration of the knife blade so as to avoid such perforation and cutting.

Accordingly, where a hunting knife is carried by the hunter, it is frequently in addition to the aforementioned specialized skinning and field dressing knives.

It would therefore be a significant advance in the art to provide a hunting knife of a type which is usable in the conventional manner and with conventional blade characteristics, but is readily adapted to skinning and field dressing operation, without the aforementioned perforation and cutting difficulties associated with the pointed-end blade structure.

U.S. Pat. No. Des. 275,360 to F. W. Child discloses a hand knife with a blade guard covering the tip and substantially the entire blade surface of a pointed blade, which is useful for storage and transport of the knife, but prevents the knife from being used while the blade guard is installed.

U.S. Pat. No. 2,255,930 to P. Jepson discloses a blade holder for razor blades in which the blade is adjustable to expose selected portions of the cutting surface of a standard, retangular form razor blade.

U.S. Pat. No. 3,241,236 to J. P. Capps discloses a game knife for skinning and dressing game animals, which features a regular knive blade edge used in the manner of a single-bladed hunting knife, and having a crescent-shaped end. The knife also features a blunt end guide which, as noted at Column 2, lines 4-14 of the patent, prevents damage to the inner organs of the animal during field dressing and skinning operations.

U.S. Pat. No. 2,466,898 to G. W. Johnson discloses a hand cutting tool with a resiliently held shield which automatically yields to expose the cutting edge when the cutting instrument is positioned against the surface of the material to be cut or marked. The user of the tool is protected against accidental contact by a shield of folded sheet metal shaped with two sides extending downwardly beyond the blade edges and held in place by a spring-and-pin assembly. By this assembly, the shield may be released to expose the cutting blade for inspection and sharpening. The guard is adapted to cover the entire blade surface of the cutting instrument, and is retracted during actual use.

Accordingly, it is an object of the present invention to provide a field dressing and skinning attachment for a hunting knife, which permits a conventional single-blade or double-blade hunting knife to be used in conventional manner when used for other than skinning and field dressing, but which is readily deployed to adapt such hunting knife to skinning and field dressing capability.

It is another object of the invention to provide a skinning and field dressing attachment of the above-mentioned type, which is easily and simply constructed, low in cost, and easily applied.

Other objects and advantages of the invention will be more fully apparent from the ensuing disclosure and appended claims.

SUMMARY OF THE INVENTION

The present invention relates to a device attachable to a hunting knife to adapt same for skinning and field dressing operation, comprising:

(a) a guard member adapted to fit over only a tip portion of blade of the knife, with a passage in the guard member receiving the tip portion of the blade, so that the guard member when attached leaves exposed a major portion of the blade cutting surface of the knife, while occluding the tip portion of the blade from cutting exposure; and (b) means for removably retaining said guard member in position at the tip portion of the knife blade.

In a particularly preferred embodiment, the guard member at its proximal portion, and in spaced relationship to the passage therein, has a hole therethrough through which a strand element may be passed so that the strand element can be manually grasped at corresponding portions of its length remote from the guard member, to manually retain the guard member in position at the tip portion of the knife blade.

The strand element may for example be a leather thong, string, rope, cord, elastic band, wire, or a natural or synthetic filament, or any other suitable means by which the guard member can be retained in blade tip-occluding position. By such means, the strand element can be manually grasped and, with the major portion of the knife blade in exposed cutting position, the skinning and field dressing operations may be carried out, with the animal hide in contact with the active cutting surface, but with the point and associated tip portion of the blade protected by the guard member from puncturing or undesirably cutting the internal organs or other fleshy parts of the game animal.

Other features and aspects of the invention will be more fully apparent from the ensuing disclosure hereof.

DETAILED DESCRIPTION OF THE INVENTION, AND PREFERRED EMBODIMENTS THEREOF

As used herein, the terms "proximal" and "distal" refer to the portions of the hunting knife which are toward and away from, respectively, a person holding the knife by its handle in the normal manner.

Figure 1:
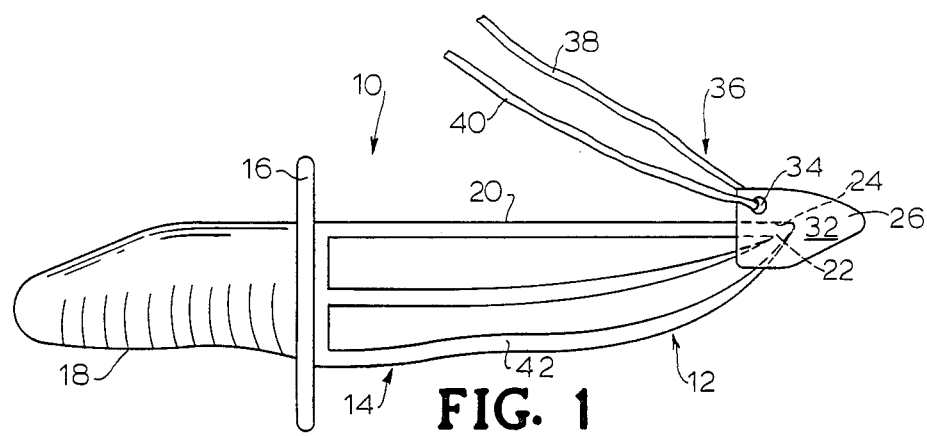
FIG. 1 is a side elevation view of a hunting knife equipped with a skinnning and field dressing attachment according to the invention.

For example, referring to FIG. 1, in which a hunting knife 10 of conventional single-bladed type is shown, the distal portion 12 of the knife blade includes the blade tip and associated forward area of the knife blade, while the proximal portion of the knife blade includes the knife blade portion which is in the vicinity of the hand guard 16.

The knife illustrated in this drawing includes a handle 18 joined to the knife blade 20, with the hand guard 16 disposed therebetween. At the distal portion 12 of the knife blade 20, the tip portion 22 of the blade is disposed in a passage 24 of the guard member 26.

Figure 2:
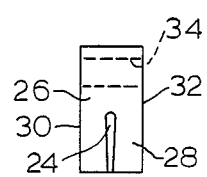
FIG. 2 is a rear elevation view of the guard member of FIG. 1.
Figure 4:
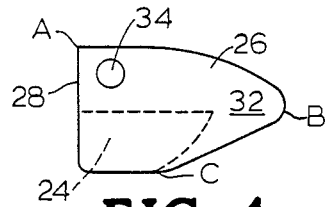
FIG. 4 is a side elevation view of the guard member of FIG. 1.
Figure 3:
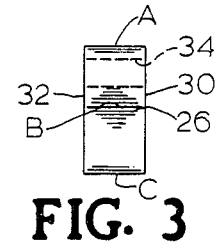
FIG. 3 is a frontal elevation view of the guard member of FIG. 1.

See also FIGS. 2 and 4 showing respective rear and side elevation views of the guard member 26, with FIG. 3 showing a frontal elevation view thereof. As shown in FIGS. 2 and 3, the guard member has respective side faces 30 and 32.

The guard member 26 has a smooth continuous frontal contour along its outer periphery when viewed in side elevation as in FIG. 4. This drawing shows the frontal contour as extending along the top surface from point A, at the intersection of the top surface with the rear face 28 of the guard member, forwardly to the frontal extremity at point B, and then rearwardly along the bottom surface of the guard member to point C, at the intersection of such bottom surface and the knife tip portion-receiving passage 24. As used herein, therefore, the term "frontal contour" refers to such side view contour, extending along the periphery of the guard member from the rear face forwardly to the frontal extremity and then rearwardly to the knife tip portion-accommodating passage.

The guard member 26 may be formed of any suitable material, such as metal, wood, and elastomers and plastics having sufficient structural rigidity and integrity for the desired use. Ceramics materials or other composites may also be usefully employed. Preferred materials of construction include thermoplastics and thermosetting plastics, such as polyethylene, acrylonitrile-butadiene-styrene polymers, polyvinylchloride, fluorocarbon polymers, chlorinated polyethers, polycarbonates, polypropylene, nylon, acetal, epoxy, phenol, and polyester materials. In general, acetal materials, such as those commercially available under the trademark Delrin ® (E. I. du Pont de Nemours & Co., Inc. Wilmington, Del.), have been used to good advantage.

In the case of elastomers and plastics as materials of construction, the guard member may suitably be formed by molding, e.g., injection molding and reaction injection molding, or by casting, or in any other suitable manner.

The knife tip portion-accommodating passage 24 is sufficiently dimensioned so that the tip portion of the knife blade is accommodated therein in a close-fitting fashion, with good structural integrity characteristics for the knife and guard member assembly when so coupled. When the passage is formed as shown in FIGS. 1, 2, and 4, the knife blade tip portion is snugly fitted in the guard member passage, so that the knife blade tip portion will not translate or displace from the guard member in use.

The guard member at its proximal portion has a hole 34 therein extending through the full width of the guard member (FIGS. 2 and 3) from the side face 30 to the opposite side face 32. This hole is in spaced relationship to the knife tip portion-accommodating passage 24.

The guard member opening 34 accommodates the passage therethrough of a strand member 36, which may for example be a leather thong, string, rope, cord, elastic band, wire, or natural or synthetic filament, it being understood that the term "strand element" is to be broadly construed to include any suitable means, and equivalents, of such types. When the strand element ends are extended after passage through the hole 34, the corresponding portions 38 and 40 along their length may be manually grasped by the knife wielder, to manually retain the guard member in tensionally secured position on the knife tip during the skinning and/or field dressing operation.

Thus, the knife may be grasped at its handle 18 by one hand, while the other hand grasps corresponding portions 38, 40 of the strand element 36, to tensionally retain the guard member in position at the knife tip. Alternatively, the strand element ends may be wrapped around the index finger or otherwise held by the fingers of the same hand holding the knife, to retain the guard member in position at the knife tip. The knife may be used in the position as shown in FIG. 1, with the knife blade edge 42 being exposed along a major portion of its length for cutting, while the tip portion 22 is occluded by the guard member 26 during such operation.

In this manner, the knife having the guard member mounted at its tip portion can be inserted into an initial incision in the hide of the animal to be skinned and/or field dressed, and the knife translated in the facing direction of the knife blade, so that the knife blade edge 42 effects cutting of the hide, while the guard member 26 protects the internal organs and fleshy parts of the animal from being penetrated by the knife tip.

In this manner, a major portion of the blade cutting edge 42 is exposed for cutting, to accommodate even the thickest animal hides, using a conventional hunting knife. The hunting knife thereby is readily adapted from its conventional configuration to a highly efficient skinning and field dressing configuration.

After the skinning and/or field dressing operation has been concluded, the guard member and knife assembly is withdrawn from the animal, and the knife blade tip portion removed from its receiving passage in the guard member. The guard member and its associated strand element may be carried in a suitable pouch of a hunting belt, or pocket of a garment, or alternatively, the guard may be tied by the strand element to a belt loop or other clothing element of the hunter.

In a preferred embodiment, the guard member is machined from a rectangular block of Delrin ® polyacetal, and the knife tip portion receiving passage 24 and hole 34 then formed therein. The hole 34 may be drilled or otherwise bored, and the knife tip portion-receiving passage 24 formed with any suitable cutting or forming tool.

It has been found suitable in some instances to form the receiving passage initially with a circular saw, and then to apply a filler in the resulting cut to shape the passage to its desired final form. The filler may comprise any suitable material for this purpose, such as putty conventionally used for auto body repair, to the extent that such filler is compatible with the guard member material of construction.

Figure 5:
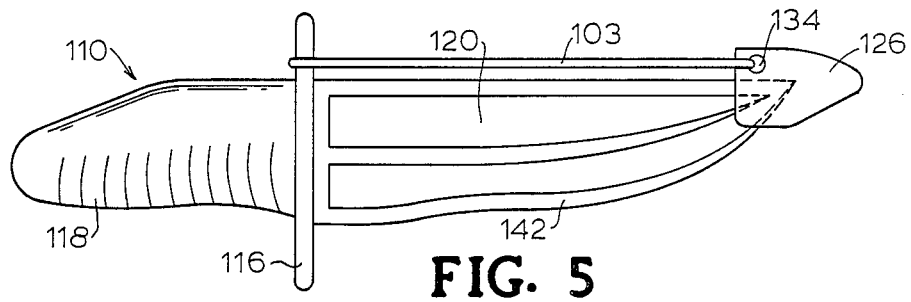
FIG. 5 is a side elevation view of a hunting knife featuring a guard member secured to the blade tip portion thereof with an elastic band which is secured to the hand guard of the knife to tensionally secure the guard member in position.

FIG. 5 shows a knife tip portion guard member according to another embodiment of the invention. All elements in FIG. 5 are numbered correspondingly with respect to the corresponding features and structure of FIG. 1, by addition of 100 to the FIG. 1 reference numeral of the corresponding part.

Thus, the hunting knife 110 shown in FIG. 5 comprises a handle 118 and knife blade 120 between which is interposed a hand guard 116. The guard member 126 is disposed at the tip portion of the knife blade 120, so that a major portion of the blade cutting edge 142 is exposed.

As used herein, the term "major portion" when used in reference to the cutting edge of the knife blade means that at least 50 percent of the cutting edge length is exposed for cutting service. Preferably, the portion of the cutting edge length which is available for skinning/field dressing cutting is at least 75 percent, it being understood that the tip portion occluded by the guard member should be as small as possible, consistent with the objectives of removing the pointed end segment of the knife blade from cutting service, and providing sufficient structure for tensionally securing the guard member in position at the tip portion of the knife blade.

In the FIG. 5 embodiment, the guard member 126 is secured in position by an elastic band 103 extending through hole 134 and tensionally rearwardly extended to and secured on the hand guard 116 of the knife.

Elastic band 103 may be formed of any suitable elastomeric material, it being understood that the term "elastic" in such context means that the band has the capability of being tensionally extended, and when tension is removed, the material will return to substantially its initial untensioned dimensional characteristics. Accordingly, the elastic band may be formed of any suitable natural or synthetic elastomeric material, e.g., natural rubber, butadiene and nitrile rubbers, Spandex ®, and Lycra ® fabrics, or other suitable stretch materials.

Figure 6:
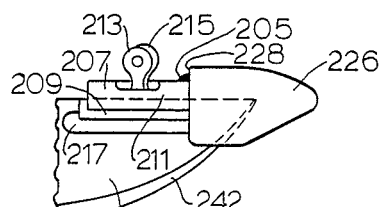
FIG. 6 is a partial side view of the distal portion of a knife blade showing a field dressing and skinning attachment according to another embodiment of the invention, secured to the blade by clamp means.

Still another embodiment of the invention is shown in FIG. 6, wherein all parts are numbered correspondingly with respect to FIG. 1, by addition of 200 to the corresponding FIG. 1 reference numbers.

In this drawing, showing the distal part of a knife blade 220 having a cutting edge 242, a guard member 226 is disposed at the knife blade tip portion, of the same general type as described illustratively in connection with FIGS. 1-4 herein. The guard member 226 at its rear face 228 is joined by bonding medium 205 to a clamp 207 of conventional type. The bonding medium 205 may be a weld, or solder, in the case of guard member materials of construction sustaining such high temperature joining methods, or a glue, cement, adhesive, etc.

The clamp 207 has planar face portions 209 joined to a generally circular barrel 211 in a known manner, the planar face portions being integrally formed at their upper ends with respective clamp handles 213 and 215. The knife blade 220 in this embodiment may be modified with the provision of a longitudinally extending groove 217 at its frontal part, in which the lower end of the clamp's planar surface portion may be reposed when the guard member is applied to the tip portion of the knife blade.

Thus, for installation, the clamp is manually clasped and pressure applied to the handles 213 and 215 to spread the planar face portions and accommodate insertion of the knife blade tip portion into the passage of the guard member 226.

After the tip portion is firmly in the passage of guard member 226, the manually applied pressure is released from the handles 213 and 215, so that the planar face portions at the lower ends of the clamp are reposed in the grooves of the knife blade, it being understood that the side of the blade opposite to that shown is similarly constructed, with a longitudinal groove corresponding to groove 217.

The clamped guard member is readily removed from the knife blade by again applying manual pressure to the clamp handles to spread the planar face portions of the clamp apart following which the knife blade tip portion is rearwardly withdrawn from the passage in the guard member.

Figure 7:
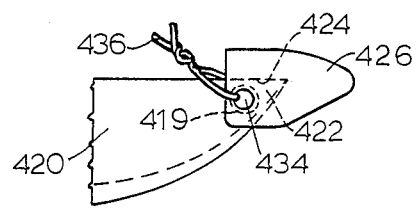
FIG. 7 is a partial side elevation view of the distal portion of a hunting knife blade, showing another means of attachment of the field dressing and skinning attachment, according to a further embodiment of the invention.

FIG. 7 shows still another embodiment according to the present invention, in which all corresponding parts have been numbered correspondingly with respect to FIG. 1, by addition of 300 to the corresponding FIG. 1 reference numbers.

As shown, the tip portion 422 of knife blade 420 is reposed in a passage 424 of guard member 426.

At its proximal portion, the guard member 426 has a hole 434 extending therethrough. In contrast to FIG. 1, however, the hole in the guard member of the FIG. 7 embodiment passes through the knife blade tip portion-receiving passage 422 of the guard member. The knife blade 420 in this embodiment is modified, by the provision of a corresponding hole 419 extending through the blade and registrable with the guard member hole 434 when the knife blade tip portion 422 is reposed in the receiving passage 424 of the guard member 426.

With the holes of the respective knife blade and guard member in register, a suitable strand element 436 is extended through the registered openings and secured as appropriate. A preferred strand element for such embodiment is a plastic-coated wire closure of the so-called "twist tie" variety. Such closure is readily applied to secure the guard member to the knife blade. The guard member subsequently is readily removed by untwisting the wire closure element and withdrawing the knife blade tip portion from the guard member. Alternatively, the strand element for such embodiment may be a string, cord, or the like, which is tied or knotted to retain the guard member in position.

In a practical embodiment of the skinning and field dressing attachment shown in FIGS. 1-4, the guard member, in the position shown in FIG. 4, may have a height of 13/16 inch, a length of 1⅜ inch, and a width (see FIGS. 2 and 3) of 7/16 inch, with the knife tip portion receiving passage 24 having a height of 7/16 inch, and a width of approximately 3/32 inch at its widest point. The hole 34 has a 3/16 inch diameter, and the guard material of construction is Delrin ® polyacetal (E. I. du Pont de Nemours & Company, Inc., Wilmington, Del.).

It is apparent that the skinning and field dressing attachment of the present invention may be readily deployed in the field on hunting knives of diverse character, to adapt same for skinning/field dressing operation. After the completion of skinning and/or field dressing, the attachment may be readily removed from the hunting knife, to restore same to its conventional form and function.

Further, although the invention has been described in detail with respect to specific embodiments, it will be apparent that other modifications, variations and embodiments are possible, and accordingly, all such variations, modifications, and embodiments are to be regarded as being within the spirit and scope of the present invention.

What is claimed is:

1. A device attachable to a hunting knife to adapt same for skinning and field dressing operation, comprising:

a guard member adapted to fit over only a tip portion of the blade of said knife, with a passage in said guard member receiving the tip portion of the blade, so that the guard member when attached leaves exposed a major portion of the blade cutting surface of the knife, while occluding the tip portion of the blade from cutting exposure;

said guard member having a vertical rear face of rectangular shape and greater height than width, flat side surfaces substantially parallel to one another, flat top and bottom rear surfaces substantially parallel to one another, and top and bottom frontal surfaces extending convergingly forwardly with respect to one another to a rounded frontal extremity, said guard member thereby comprising a smooth continuous and generally bullet-shaped frontal contour;

said passage being open to insertion of a knife tip portion at said rear face, and open at said flat bottom rear face for protrusion of the knife blade cutting surface therefrom, said passage extending upwardly from the rear bottom surface partially into the guard member; and a hole in a rear upper portion of the guard member, extending therethrough between said flat side surfaces, said hole being above and in vertically spaced relationship to said passage, whereby a stand element may be passed through said hole and manually grasped at corresponding portions of its length remote from said guard member, to manually retain said guard member in position at said tip portion of the knife blade.

2. A device according to claim 1, wherein said guard member is formed of a material selected from the group consisting of metal, wood, elastomers, and plastics.

3. A device according to claim 1, wherein said guard member is formed of a plastic material.

4. A device according to claim 1, comprising a said strand element.

5. A device according to claim 4, wherein said strand element is selected from the group consisting of leather thongs, strings, ropes, cords, elastic bands, wires, and natural and synthetic filaments.

6. A device according to claim 1, wherein said guard member is formed of polyacetal.

7. A device according to claim 1, wherein said guard member has a height of 13/16 inch, a length of 1⅜ inch, and a width of 7/16 inch, said passage has a height of 7/16 inch and a width at its widest point of approximately 3/32 inch, and said hole has a diameter of 3/16 inch.

* * * * *